United States Patent [19]

Andrew

[11] Patent Number: 4,580,345

[45] Date of Patent: Apr. 8, 1986

[54] LASER PIPE LAYOUT DEVICE

[75] Inventor: Roger F. Andrew, Hamilton, Ohio

[73] Assignee: Armco Inc., Middletown, Ohio

[21] Appl. No.: 644,499

[22] Filed: Aug. 24, 1984

[51] Int. Cl.[4] ........................ B43L 13/10; G01C 1/00

[52] U.S. Cl. ........................ 33/21.3; 33/228; 33/529; 33/DIG. 21

[58] Field of Search ............ 33/1 G, 1 N, 20 R, 21 R, 33/21 C, 228, 285, 286, 293, 299, 529, DIG. 21

[56] References Cited

U.S. PATENT DOCUMENTS

| | | | |
|---|---|---|---|
| 2,337,957 | 12/1943 | Akins | 33/21 C |
| 2,549,911 | 11/1949 | Lee | 33/21 |
| 2,636,273 | 4/1951 | Morris | 33/69 |
| 2,717,454 | 9/1955 | Sekki | 33/529 |
| 3,166,620 | 1/1965 | Galezniak | 33/21 C |
| 3,238,623 | 8/1964 | Lee | 33/21 |
| 3,828,443 | 8/1974 | James | 33/285 |
| 3,835,541 | 9/1974 | Whitworth | 33/21 |
| 4,321,551 | 3/1982 | Bleil et al. | 330/4.3 |
| 4,333,242 | 6/1982 | Genho, Sr. | 33/227 |
| 4,367,021 | 1/1983 | Nordgren et al. | 33/1 H |

FOREIGN PATENT DOCUMENTS

| | | | |
|---|---|---|---|
| 486530 | 9/1952 | Canada | 33/21 C |
| 616797 | 2/1927 | France | 33/285 |
| 790910 | 5/1961 | France | 33/21 C |
| 846884 | 8/1960 | United Kingdom | 33/21 C |

*Primary Examiner*—Richard R. Stearns
*Attorney, Agent, or Firm*—Frost & Jacobs

[57] ABSTRACT

A method and apparatus for scribing a severance line around the circumference of a pipe employing a protractor with a rotative arm and alignment guide pin; and a laser beam producing a vertical line beam. The protractor is mounted on the pipe to be cut so that the protractor is parallel with respect to the longitudinal center line of the length of the pipe. Once the protractor is parallel and set to the desired angle, the laser beam is energized to project a line upon the pipe which is in alignment with the alignment guide pins. The projected line is chalked on the pipe and the pipe is cut in any conventional manner.

9 Claims, 12 Drawing Figures

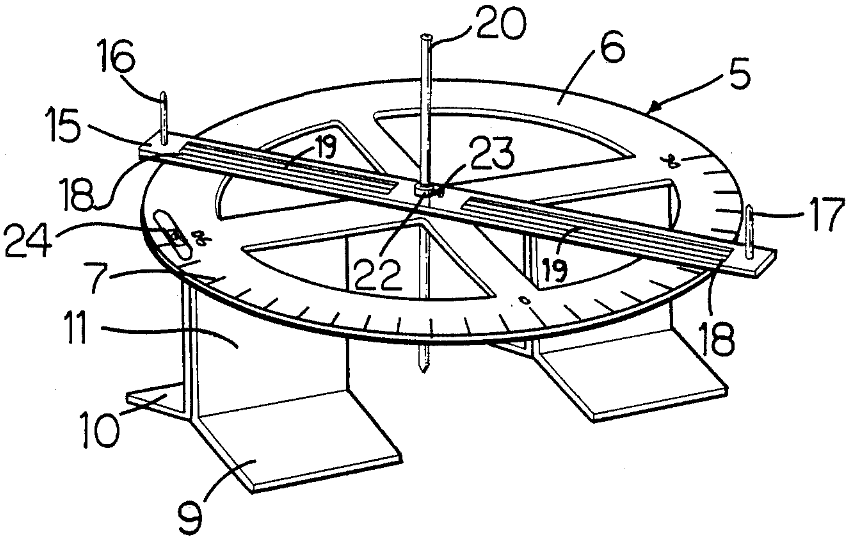
FIG. 2
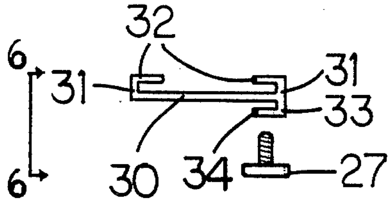
FIG. 5
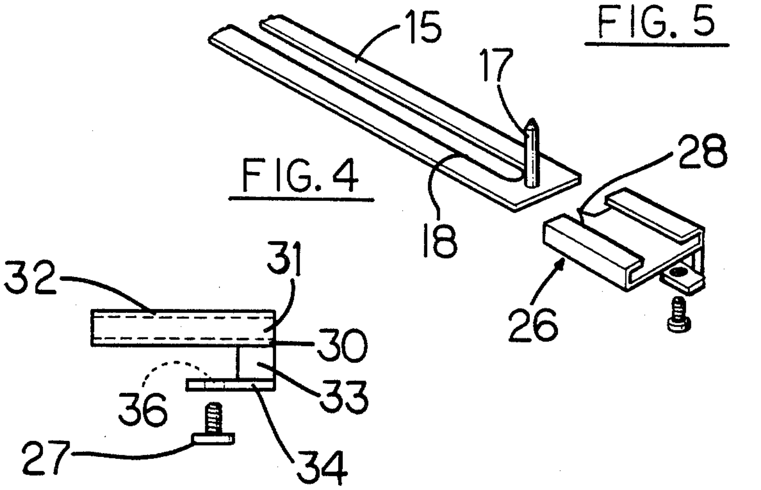
FIG. 4
FIG. 6

LASER PIPE LAYOUT DEVICE

BACKGROUND OF THE INVENTION

1. Field of the Invention.

The present invention pertains to a method for laying out a structural member with a laser beam and the associated apparatus. In particular, the present invention employs a free-standing laser and a protractor designed to be positioned on top of the structural member such as, for example, a pipe, so that a technician can chalk a severance line on the pipe formed by the laser beam when it is in alignment with the protractor. After the pipe has been chalked according to the process of the present invention, it is cut in any conventional manner.

2. Prior Art.

Prior art devices generally consist of a marker and an associated template or protractor. These devices usually fasten onto the pipe by means of a clamp or the like. After the pipe has been marked or scribed as desired, the device is detached from the pipe and the pipe is cut as scribed. The following patents illustrate typical pipe layout devices.

U.S. Pat. No. 2,549,911 to Lee discloses an elongated table with an adjustable pipe bed mounted atop the table for supporting pipe having a small range of diameter and lengths. A protractor plate is also mounted on the table and is set to the desired angle to which the pipe is to be cut. Once the pipe is secured on the table by means of the adjustable pipe bed and the protractor is set to the desired angle, an arm member is securely fastened to one end of the pipe to be cut. The arm member is in continual abutment with the protractor so that, as the pipe is rotated, it reciprocates longitudinally enabling a marker to scribe a severance line around the entire circumference of the pipe. After the pipe is detached from the table it is cut along the severance line.

Although the Lee patent is capable of scribing a severance line on pipe having a small range of sizes, it is incapable of scribing a line on both small diameter pipe and large diameter pipe (in the order of 4 foot or more) of any length. Moreover, the Lee patent fails to mention employing the device for scribing a beveled cut in addition to an angled cut.

U.S. Pat. No. 3,238,623 to Lee discloses a pipe layout device having a base portion which is held securely to the pipe to be marked, by means of a chain which wraps around the circumference of the pipe. Mounted upon the base portion is a guide bar which is attached to a holding arm and a holder. The guide bar includes a reference means with degree marks indicating the desired angle to which the pipe is to be cut. This device is capable of marking the entire circumference of the pipe, by first marking the upper portion of the pipe, and then sliding the holding arm to the lower portion of guide bar and marking the lower portion of the pipe.

While this device is capable of marking the entire circumference of the pipe, accuracy is lost when the holding arm is moved from the upper portion of the guide bar to the lower portion of the guide bar. Furthermore, this device is unable to cut pipe having a large range of diameters because of the limiting length of the holding arm and holder. Moreover, this device requires the pipe to be lifted or elevated in order to permit the holding arm and holder to mark the entire circumference of the pipe. Additionally, the Lee patent fails to mention employing the layout device for scribing a beveled cut and an angled cut.

Thus, a need exists for developing a device capable of indicating, on any size structural member, a severance line at precisely the angle desired. In particular, there exists a need for a device which can indicate a severance line without the need of having to lift the structural member, especially in the case of large diameter pipe. Furthermore, there is a need for a device which is capable of marking the entire circumference of the structural member without the need to adjust or relocate the template or protractor. Lastly, there is a need for a device capable of scribing both a beveled severance line and a skewed severance line.

SUMMARY OF THE INVENTION

The present invention is capable of indicating a severance line around the entire circumference of a structural member, such as a pipe, without moving the pipe or the crucial elements of the device such that an accurate scribing line may be marked upon the pipe. The present invention employs a free-standing laser which is capable of projecting a beam of light in a vertical line by means of a fan lens and is mounted upon a tripod distinctly distant from the pipe. Additionally, the device of the present invention includes a protractor designed to be mounted upon the pipe, parallel with the longitudinal or center axis of the pipe. The protractor includes a center pin which is perpendicular to the protractor and extends through its center. The protractor also includes one or more alignment guide pins associated with or secured to the protractor.

In the preferred embodiment, a rotating arm is mounted on the protractor which pivots around the center of the protractor. Mounted on top of the pivoting arm is one or more vertically symmetrical, planar alignment guide pins which may be positioned at one or both ends of the rotating or pivoting arm.

By setting the rotating or pivoting arm to the desired angle on the level protractor, a severance line is indicated on the pipe by aligning the vertical beam from the laser with one of the alignment guide pins and the center pin. In those instances where the rotating or pivoting arm is not employed, the associated alignment guide pin may be secured to the protractor at the desired angle, so that a severance line will be indicated when the laser beam is in alignment with the associated alignment guide pin and the center pin.

The preferred embodiment may also include a second protractor assembly mounted on the laser so that the layout device is not capable of scribing a skewed severance line in addition to a beveled severance line. This may be accomplished by first scribing the beveled severance line as previously discussed. Then the laser is rotated until the linear beam is in alignment with the longitudinal or center axis of the pipe. Next the second protratcor is set so that the 90°-90° line is aligned with the laser beam. The laser is then rotated until the beam is perpendicular to the 90°-90° line of the second protractor, i.e., rotated until the indicator points to 0°. Lastly, the laser is rotated to the desired skew angle as determined by the indicator. The beam of the laser indicates the skew severance line, which may be marked. The skew severance line may be cut in any conventional manner.

In the broadest sense, the present invention consists of a laser beam capable of projecting a vertical line of light, and a protractor capable of being mounted upon a structural member to be cut, so that its axis is parallel with the center line of the structural member, the protractor having a perpendicular center pin and at least one planar alignment guide pin.

The broadest concept of the invention also includes a method of mounting a protractor having a center pin upon a structural member to be cut so that it is parallel with the center line of the structural member, setting an alignment guide pin at the desired angular position, energizing a laser beam having a vertical line beam, aligning the vertical line beam with the alignment guide pin and with the center pin of the protractor, marking the resulting severance line on the structural member, and cutting the structural member at the indicated severance line.

BRIEF DESCRIPTION OF THE DRAWINGS

FIG. 2 is a top elevational perspective view of the protractor of the present invention.

FIG. 4 is an fragmentary exploded view of the pivotable arm and slide bar of the present invention.

FIG. 5 is an end view of the slide bar of the present invention.

FIG. 6 is a side view of the slide bar taken along line 6—6 of FIG. 5.

DESCRIPTION OF THE PREFERRED EMBODIMENTS

Figure 1:
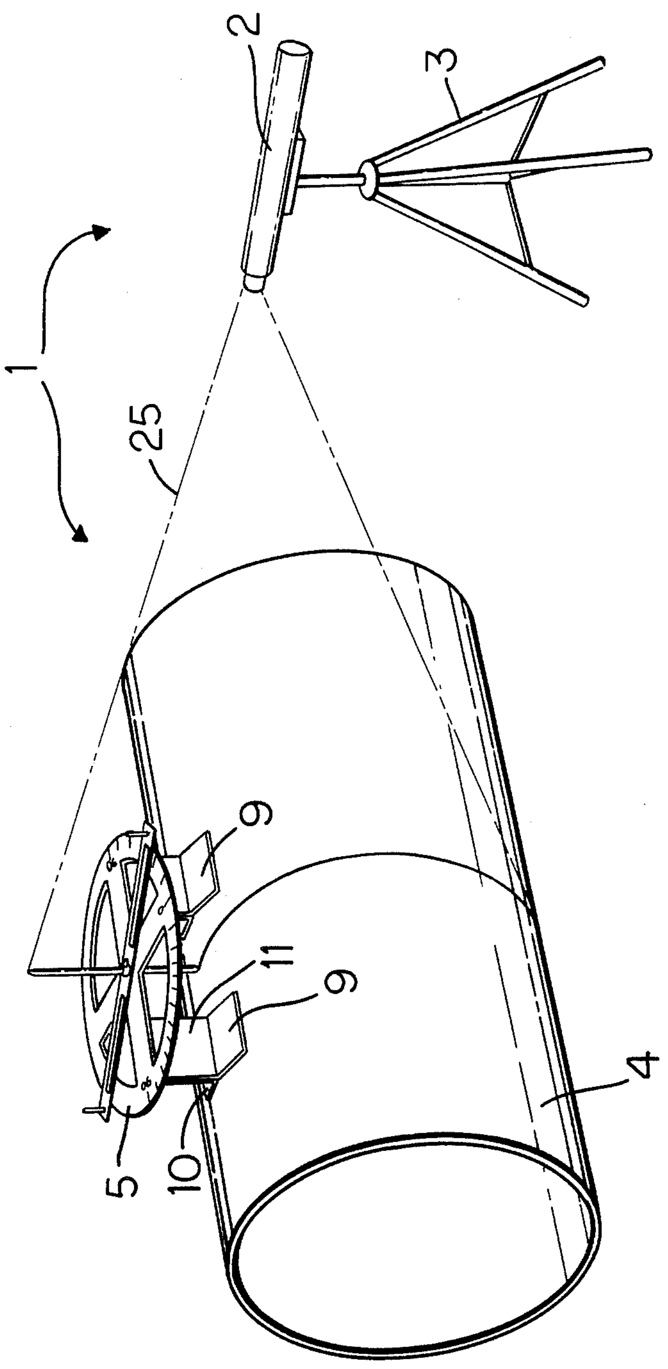
FIG. 1 is an elevational perspective view of the elements of the present invention in which the protractor is mounted atop a pipe to be scribed and cut.

Although the device of the present invention is designed to be applicable to all sizes of structural members, it is particularly applicable to large structural members because it is not necessary for the members to be lifted in order to make a severance line, unlike some prior art devices. Although the device of the present invention is specifically described for use with pipe, it may also be employed in conjunction with ellipse pipe, pipe arch, or other hollow elongated objects. It could also be similarly employed in conjunction with solid elongated structural members such as I-beam, H-beam, box-beam, or the like. The structural members to be cut could be made of metal, plastic, wood or the like.

Reference numeral 1 generally indicates the apparatus of the present invention as it is employed on pipe to be cut. A laser 2 mounted upon a tripod 3, or the like, is separate from and unattached to the pipe 4 to be cut. Pipe 4 may be horizontally positioned, or it may be positioned at any angle, and yet the device of the present invention may still be utilized. In order to carry out the method of the present invention, it is only necessary that the protractor 5 be mounted parallel with the longitudinal line of the pipe 4. Moreover, the design of the protractor enables it to be at least partially self-levelling. The protractor may be generally circular, elliptical, oval or the like, with the eliptical shape being preferred in order to employ large angle markings on the protractor.

Figure 3:
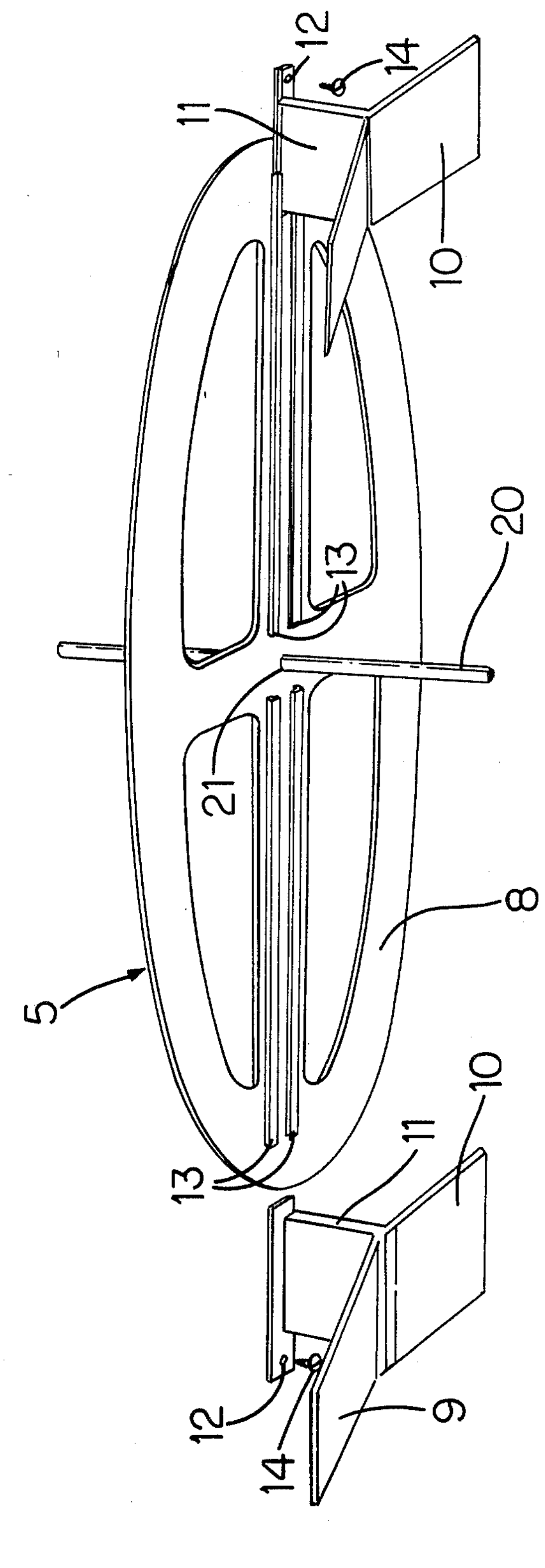
FIG. 3 is a bottom elevational perspective view of the protractor of the present invention.

As shown in FIG. 2, the protractor has an upper surface 6 with degree angles 7 marked thereon and a lower surface 8 (see FIG. 3). The protractor 5 is mounted upon one or more pairs of outwardly diverging legs 9 and 10, which form the same angle between each leg and a vertical plane. Each pair of outwardly diverging legs 9 and 10 is integrally attached to one or more vertical members 11.

As illustrated in FIG. 3, the upper ends of the vertical members 11 terminate in a slide plate 12, which is designed to be parallel with the protractor 5 when attached thereto. One or more pairs of grooved channel bars 13 are securely fastened to the bottom surface 8 of protractor 5. The grooved channel bars 13 extend longitudinally with respect to the elliptical protractor and with respect to the pipe, when the protractor is properly positioned on the pipe. Each slide plate 12 is designed to slide within a pair of grooved channel bars 13, as illustrated in FIG. 3, and may be firmly secured thereto by means of one or more set screws 14.

A pivotable arm 15, shown in FIG. 2, is positioned on the top surface 6 of the protractor 5. The arm 15 is shaped like a yard stick, but may be any shape such as a U-shaped channel rod. Alignment guide pins 16 and 17 are perpendicularly positioned near each end of the pivotable arm 15, so that they project upwardly away from the upper surface 6. The pivotable arm 15 includes one oblong opening 18 near one end of the arm. Preferably, the opposite end of arm 15 also has an oblong opening 18 in order to balance the arm. Each opening 18 has a thin strand of wire 19 stretched along the longitudinal center of the arm 15 for accurately indicating the precise degree angle desired.

A center pin 20 projects through a center hold 21 (see FIG. 3) in protractor 5, which maintains the pin in perpendicular alignment with the protractor. Additionally, the center pin 20 projects through the ring collar 22 which is secured to and positioned at the center of the arm 15. The ring collar 22 includes a thumb screw 23 which secures the pivotable arm 15 to the center pin and determines what length of the center pin projects below the protractor 5. Once the pivotable arm 15 is fastened to the center pin 20, gravity holds the arm adjacent to the protractor. Nevertheless, it may be desirable to attach another ring collar (not shown) to the bottom surface 8 of the protractor 5 so that when both ring collars are attached to the center pin 20, neither the center pin nor the pivotable arm 15 may be moved from the protractor 5. Because the entire device is made to be portable, it may be desirable to employ both ring collars so that the protractor, including the pivotable arm 15 and the center pin 20, do not become detached from the protractor during transportation.

In order for the device to accurately indicate a severance line which is in alignment around the entire circumference of the pipe, it is necessary that the center pin 20 be perfectly perpendicular to the longitudinal or center line of protractor 5. This is accomplished by maintaining close tolerances with respect to the center pin 20 and the center hole 21. Moreover, the close tolerances will not be affected by thumb screw 23, so that the center pin is still perpendicular with respect to the protractor when the thumb screw 23 is tightened.

Optionally, a built-in level indicating means 24 is mounted beneath the protractor 5 in an aperture of the protractor such that it is flush with and visible from the upper surface 6 of the protractor 5. The level indicator, which may be the conventional bubble type, is positioned perpendicular to the length of the pipe to be cut. Thus, the level indicator means 24 indicates whether the protractor 5 is centered on the pipe. As stated previously, the pipe may be horizontal or at an angle to the horizontal. Accordingly, it is not necessary for the protractor to be level in all directions, but only with respect to a longitudinal line of the pipe.

If the outer circumference of the pipe is perfectly cylindrical and the diverging legs 9 and 10 form the same angle between each leg and a vertical plane, the employment of a level indicating means will not be necessary because the protractor may be jiggled until all diverging legs equally rest upon the pipe. When this occurs, the protractor is parallel with respect to the longitudinal length of the pipe.

In operation of the device illustrated in FIGS. 1–3 in which a simple bevel cut is desired, the protractor is mounted atop a pipe, which may be horizontally positioned or positioned at an angle to the horizontal, and mounted so that the longitudinal length of the elliptical protractor is parallel with the longitudinal length of the pipe. The pivotable arm is set to the desired angle at which the pipe is to be cut and securely fastened by thumb screw 23. Laser 2 is energized to project in a line, a vertical beam of light on the center pin 20 and one of the guide pins 16 or 17. The pipe is then scribed with chalk, for example, on the severance line projected on the pipe by the laser. In applications where the pipe is very large, for example, ten feet in diameter, the guide pin 16 or 17 completely blocks the projection of the laser beam on the upper portion of center pin 20. For this reason, center pin 20 is usually positioned so that its lower end contacts the pipe 4. In this position the laser beam projects on the guide pin 16 or 17 and the lower portion of center pin 20.

If the structural member to be cut is ellipse pipe, pipe arch, I-beam or other non-symmetrical members, it will be necessary to position the protractor on the top of the structural member as it will be finally positioned, before scribing a severance line.

At any one time, a technician or operator will only be able to scribe approximately one-half of the diameter of the pipe. Thus, when the pipe is scribed on one-half of its circumference, the laser beam is repositioned to the other side of the pipe and once again placed in alignment with the center pin 20 and the other guide pin, whereupon the severance line for this side of the pipe is chalked by the operator or technician. This procedure is accomplished without disturbing the protractor 5 so that it remains level in accordance with level indicating means 24 and continues to indicate the exact angle when scribing the other side of the pipe. If small diameter pipe is to be cut, it may be convenient to only scribe one side of the pipe and use the scribed line as a guide to cut the entire pipe, as is known with prior art devices. After disconnecting and dismantling the laser and protractor, the pipe is cut along the severance line by any conventional method.

If it is desirable to cut the pipe at a specific distance from one end of the pipe, the distance is measured and marked by lowering the center pin 20 until its lower end, which is preferably pointed, contacts the measured distance. The thumb screw 23 is tightened thus locking-in both the angle of the arm 15 and the measured distance. The laser is then energized and the beam of light 25 is projected onto the pipe as previously described.

Figure 10:
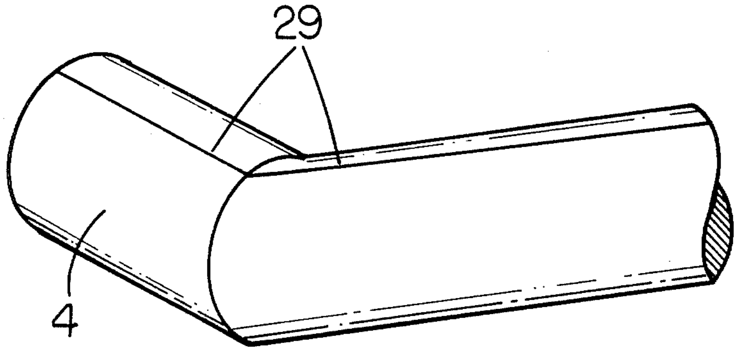
FIG. 10 is an elevational perspective view of the pipe scribed and cut according to one method of the present invention.

If the cut pipe is to be welded or otherwise joined to another pipe to form an angle, it is often desirable to first scribe a pair of longitudinal lines by projecting the beam 25 of light from the laser 2 on the pipe to be cut, rotating the laser until beam 25 is parallel with the longitudinal length of the pipe, scribing with chalk, or the like, along the projected beam on both the near and far side of the pipe so that the two scribed lines 29 are in a plane which includes the center longitudinal line of the pipe. The desired angle of the formed pipe is then halved and the guide pin of the protractor is set to the halved angle. The pipe is scribed and cut as previously described. As illustrated in FIG. 10, in order to assure that the pipe is welded at the correct angle, the welders merely have to rotate the two pieces of the pipe until the opposite scribed lines 29 are in alignment with one another. Thus, the two halved angled pipes join one another to form the desired total angle.

Figure 7:
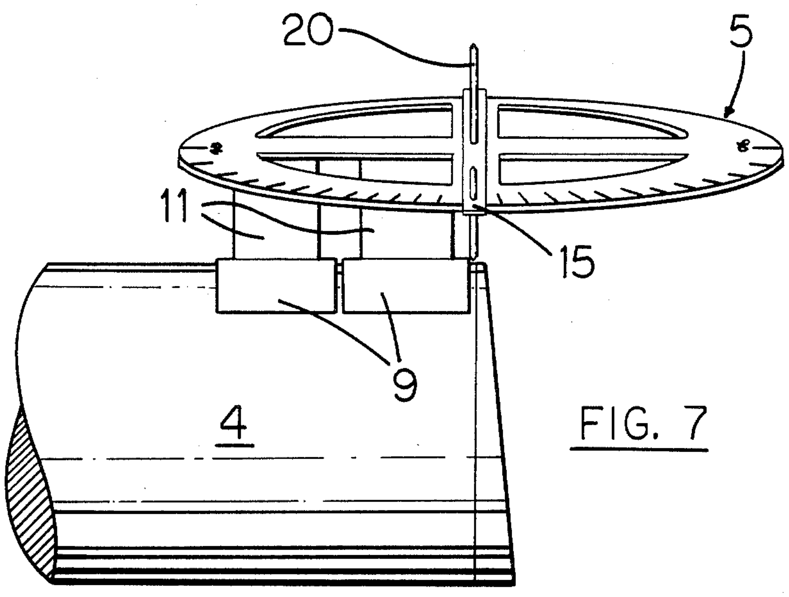
FIG. 7 is an elevational perspective view of a modified mounting of the protractor of the present invention.

Sometimes it is necessary to square off the end of pipe. As illustrated in FIG. 7, this may be accomplished by placing both pairs of diverging legs 9 and 10 on one side of the protractor 5 so that it is well supported. Pivotable arm 15 is then set so that it is perpendicular with respect to the length of the pipe. The laser beam 25 is then projected on the pipe so that it is aligned with both the center pin 20 and one of the alignment guide pins 16 or 17. The pipe is then scribed and cut as described previously.

Instead of employing a ring collar 22 and a thumb screw 23, a slide bracket may be used. A slide bracket 26, indicated in FIGS. 4, 5 and 6, is mounted upon the pivotable arm 15. As illustrated in FIGS. 4 and 6, a thumb screw 27 is designed to firmly secure the slide bracket 26 to the protractor 5 so that a specific angle is maintained during the alignment of the laser beam with one of the alignment guide pins 16 or 17, and center pin 20.

FIGS. 4, 5, and 6 illustrate the slide bracket 26. In particular, FIG. 5 illustrates an end view of slide bracket 26 in which a pointer indicator 28 is illustrated and designed to permit the technician to align the pivotable arm 15 with the desired degree mark 7. This is accomplished by the fact that pivotable arm 15 has at each of its ends an oblong orifice 18 without wire 19, which permits the technician to see both the pointer 28 and the desired degree mark 7. Slide bracket 26 consists of an upright U-shaped bracket having a base portion 30 with two vertically projecting wall members 31 near the side edges of the base portion. Atop each of the vertically projecting wall members is a horizontal wall member 32 designed to permit the U-shaped slide bracket 26 to be slidably movable on the pivotable arm 15. From one side of base portion 30 is a downwardly depending projection 33 which is attached to a horizontally depending wall 34. Wall 34 and base member 30 are parallel with one another spaced the thickness of downwardly depending projection 33. The horizontal projecting wall 34 has a hole 36 with screw threads cut therein adaptable to receive thumb screw 27 in the known manner. As the desired cut to be made on pipe 4 approaches the 90° mark on the elliptical protractor 5, it will be necessary for the slide member 26 to slide outwardly away from the center pin 20 in order to clamp the slide bar 26 securely to the outer edge of the protractor 5. As the pivotable arm 15 approaches a position substantially perpendicular to the length of pipe 4, that is, 0° as indicated on protractor 5, the slide bar slides inwardly toward the center pin 20 in order to securely fasten the slide bar and pivotable arm to the protractor 5. Of course, protractor 5 may be circular in which case it would not be necessary to make bracket 26 a slide bracket, but instead, a stationary bracket could be employed. Additionally, oblong aperture 18 could be substantially reduced in length, if desired.

Figure 8:
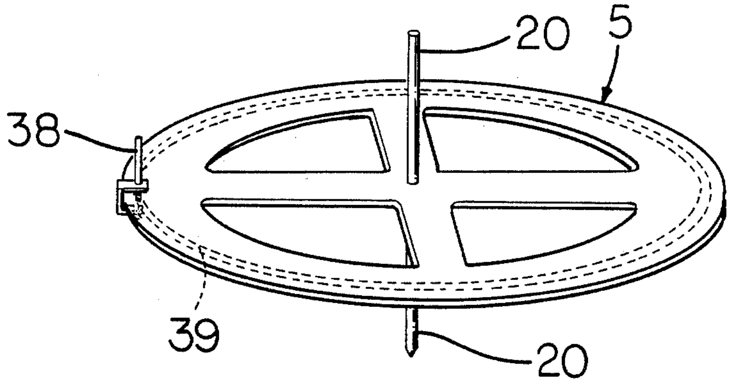
FIG. 8 is an elevational perspective view of a modified protractor of the present invention.
Figure 9:
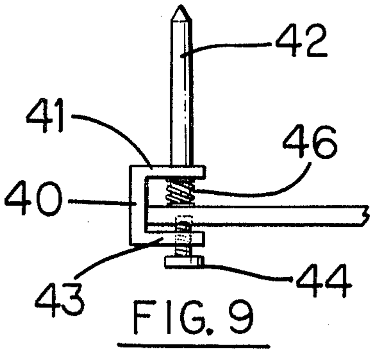
FIG. 9 is an enlarged fragmentary side view of a modified alignment guide pin mounted on a protractor.

Instead of guide pins 16 and 17 being mounted on the pivoting arm 15, as shown in FIGS. 1–7, an alignment guide pin assembly 38 may be independently mounted on the protractor, as illustrated in FIGS. 8 and 9. As shown therein, the protractor 5 has an elliptical groove 39 in the lower surface 8 near its periphery, the purpose of which which will become evident later.

The guide pin assembly 38 has a C-shaped clamp 40 whose upper surface 41 vertically mounts a guide pin 42. The lower surface 43 of the C-shaped clamp 40 mounts a thumb screw 44 which engages the elliptical groove 39 assuring vertical orientation of the guide pin 42. The guide pin 42 is spring biased by means of spring 46 as best illustrated in FIG. 9. The guide pin 42 is normally biased toward the thumb screw 44 so that the protractor is firmly held between the spring biased guide pin 42 and the thumb screw 44.

In operation, it is only necessary to slightly loosen the thumb screw 44 or squeeze the upper surface 41 of the C-clamp toward the protractor 5 to collapse the spring 46 in order to move the guide pin assembly 38 to the desired angle. The remaining operation of the protractor is similar to that previously described.

Figure 11:
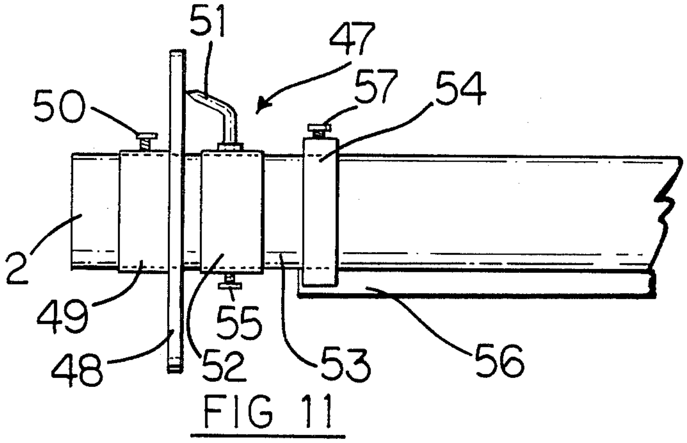
FIG. 11 is an elevational fragmentary view of a second small protractor assembly mounted upon the laser.
Figure 12:
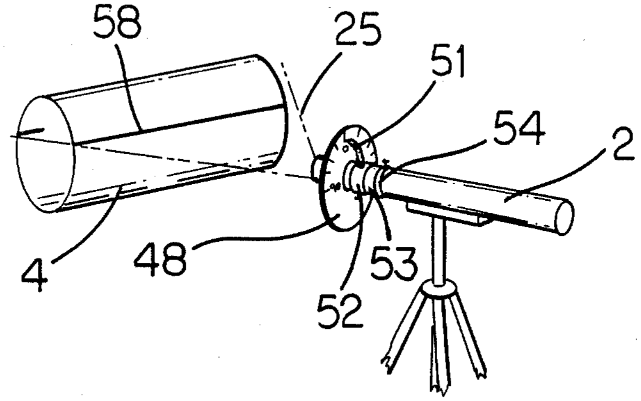
FIG. 12 is a fragmentary perspective view of the laser beam and associated small protractor assembly as it projects a beam of light from the longitudinal center line of a pipe to be cut.

FIGS. 11 and 12 illustrate the small second protractor assembly 47 mounted on the laser 2 normal to its length. The assembly 47 is employed whenever it is desirable to scribe a skew bevel severance line. The protractor assembly 47 comprises a protractor plate 48 integrally attached to a ring collar 49. The laser 2 extends through both the protractor plate and the ring collar so that they are entirely supported by the laser. The ring collar 49 has a thumb screw 50 for securely fastening the ring collar and thus the protractor plate to the laser.

An indicator 51 is securely attached to a second ring collar 52 which is mounted upon sleeve ring 53 of bearing support 54. A thumb screw 55 firmly engages the second ring collar 52 with the sleeve ring 53. Bearing support 54 is rotatably attached to tripod frame support 56. Additionally, the bearing support 54 has a thumb screw 57 for firmly securing the bearing support to the laser.

When it is desired to scribe a skew bevel severance line, the pipe is first scribed as previously described, thus making a bevel layout. If the protractor is not positioned on the top of the pipe as it will lay in its final position, it will be necessary to move the protractor to the top before continuing. Then, laser 2 is rotated until its projected beam of light 25 is superimposed on the longitudinal center line 58 of the pipe, as shown in FIG. 12. Thumb screw 50 is loosened so that the protractor plate 48 may be rotated until its 90°–90° line is in alignment with the projected longitudinal center line 58 of the pipe 48 and the laser beam 25. Thumb screw 50 is retightened, and thumb screw 55 is loosened so that the indicator 51 may be rotated until it indicates 0°. Thumb screw 55 is retightened and the laser is rotated to the desired angle as indicated by the pointer 51. The projected line is then scribed on the pipe and the pipe is cut at both the bevel amd skew angles. If it is desired to lock-in the position of the laser 2, thumb screw 57 may be tightened to prevent rotation of laser 2.

What is claimed is:

1. A method of cutting an elongated structrual member comprising: mounting a generally planar protractor having a center reference means positioned perpendicular to said planar protractor upon said structural member wherein a longitudinal line of the length of the structural member is parallel with said planar protractor, positioning an alignment guide means upon the protractor at the desired angle to which said structural member is to be cut; energizing a vertical beam laser; positioning said laser until the laser beam is in alignment with said alignment means mounted upon said protractor and said center reference means; marking the structural member along said laser beam; and cutting said structural member along said marking.

2. The method of claim 1, wherein said alignment guide means includes an arm which rotates about the center of the protractor.

3. The method of claim 2, wherein said arm includes at least one alignment guide pin which is normal to said arm.

4. The method of claim 2, wherein the step of positioning an alignment guide means upon said protractor includes means to securely fasten said arm to said protractor at the desired angle.

5. The method of claim 4, wherein said means to securely fasten the arm includes a slide bracket mounted on said arm and a thumb screw.

6. The method of claim 2, wherein the step of positioning an alignment guide means upon said protractor includes means to securely fasten said arm to said center reference means.

7. The method of claim 1, wherein said protractor includes a level indicating device.

8. The method of claim 1, wherein said protractor includes a base portion comprising a pair of diverging legs integrally attached to a generally vertical section, which is secured to the protractor.

9. The method of of claim 8, wherein said protractor has a pair of base portions.

* * * * *